United States Patent [19]

Olds et al.

[11] Patent Number: 5,735,306
[45] Date of Patent: Apr. 7, 1998

[54] REGULATOR FLOW FLUCTUATION STABILIZER

[75] Inventors: Charles M. Olds, Anna; Mark E. Hood, Allen; John D. Hostutler, Princeton, all of Tex.

[73] Assignee: Fisher Controls International, Inc., Clayton, Mo.

[21] Appl. No.: 698,819

[22] Filed: Aug. 16, 1996

[51] Int. Cl.⁶ .................................................. G05D 11/00
[52] U.S. Cl. ........................ 137/116.5; 137/505.46; 137/505; 251/64
[58] Field of Search ................ 137/116.5, 505.46, 137/505; 251/64

[56] References Cited

U.S. PATENT DOCUMENTS

| Re. 31,932 | 7/1985 | Christianson | 128/204.26 |
|---|---|---|---|
| 1,250,104 | 12/1917 | Gustafson | |
| 1,839,980 | 1/1932 | Luchs et al. | 137/505.47 |
| 1,950,120 | 3/1934 | McKee | 137/505.47 |
| 2,023,361 | 12/1935 | Tigges | 137/153 |
| 2,593,103 | 4/1952 | Casler | 251/119 |
| 2,867,234 | 1/1959 | Billington | 137/116.5 |
| 3,056,424 | 10/1962 | Courtot et al. | 137/116.5 |
| 3,072,143 | 1/1963 | Fleischhacker | 137/514 |
| 3,210,056 | 10/1965 | Van't Sant | 137/533.17 |
| 3,386,465 | 6/1968 | Johnson | 137/505.46 |
| 3,488,685 | 1/1970 | Hughes | 137/116.5 |
| 3,590,849 | 7/1971 | Austin | 137/116.5 |
| 3,900,045 | 8/1975 | Murrell | 137/505.38 |
| 3,974,851 | 8/1976 | Garetson | 137/494 |
| 4,069,839 | 1/1978 | Hughes | 137/505.46 |
| 4,491,149 | 1/1985 | Trinkwalder | 137/505.46 |
| 4,542,852 | 9/1985 | Orth et al. | 236/92 B |
| 4,724,867 | 2/1988 | Gillespie, III et al. | 137/114 |
| 4,974,630 | 12/1990 | Chang | 137/460 |
| 5,131,425 | 7/1992 | Sturgis | 137/116.5 |
| 5,402,820 | 4/1995 | Duffy et al. | 137/505.36 |

FOREIGN PATENT DOCUMENTS

| 17 50 130 | 7/1971 | Germany. |
|---|---|---|
| 25 10 235 | 9/1977 | Germany. |

OTHER PUBLICATIONS

Fisher Controls International, Inc. *Regulator Type 627*, Bulletin 71.1:627, p. 4.
Fisher Controls International, Inc. *Regulator Type R522H*, Sep. 1991 (1 page).
REGO, *Regulator LV4403*, p. 9.

*Primary Examiner*—Denise L. Ferensic
*Assistant Examiner*—Joanne Y. Kim
*Attorney, Agent, or Firm*—Marshall, O'Toole, Gerstein, Murray & Borun

[57] ABSTRACT

A fluid flow regulator having a spring clip frictionally engaging the pivoting regulator lever to stabilize flow fluctuations. Alternatively, a disk wedge with opposite leg portions frictionally engages the moving regulator diaphragm.

4 Claims, 3 Drawing Sheets

REGULATOR FLOW FLUCTUATION STABILIZER

Benefit is claimed of a co-pending provisional application Ser. No. 60/002,496, filed Aug. 18, 1995.

This invention relates to fluid pressure regulators and in particular to apparatus for stabilizing the performance of such regulators.

BACKGROUND OF THE INVENTION

Fluid regulators, such as gas pressure regulators are in common use in gas pipeline systems to assist in maintaining system pressure within acceptable limits. As an example, the primary function of a gas pressure regulator is to match the flow of gas through the regulator to the demand for gas placed upon the system. Also, the pressure regulator must maintain the system pressure within acceptable limits. In one type of such gas pressure regulator, a diaphragm assembly is set to a predetermined set point by an adjustable control spring. A pivoting lever is connected to the diaphragm assembly and responds to diaphragm pressure to throttle a disk with respect to an orifice, where the orifice communicates the inlet pressure to the regulator outlet.

The disk and orifice may be referred to as portions of a restricting element which are placed into the gas flow stream and provide a variable restriction that can modulate the flow of gas through the regulator in accordance with the sensed downstream pressure. The diaphragm assembly may also be called a loading element which can provide a loading force to the restricting element. Thus, a loading pressure is applied to the diaphragm in response to the sensed downstream pressure to produce a loading force that will act to close the restricting element. The diaphragm spring provides a reverse loading force which acts to open the restricting element.

Accordingly, if the load flow in the pipeline system decreases, then the regulator flow also must decrease in order to avoid having the regulator place too much gas into the system which would tend to increase the downstream pipeline pressure. On the other hand, if the load flow increases, then the regulator flow also must increase in order to keep the pipeline pressure at the regulator output from decreasing due to a shortage of gas in the pipeline system.

Occasionally, a certain amount of operational instability in the performance of currently used fluid pressure regulators has been noted. In particular, one noted instability involves a fast cycling instability in regulator operation with a repetition frequency of 20–50 hertz. This type of regulator instability has been solved during the design and development of prior pressure reducing regulators by providing a stabilizing flapper in the throat of the regulator lower actuator casing. It is believed that the stabilizing flapper acted in the manner of an air shock to dampen the regulator operational instability.

In this prior regulator, known as the Fisher Type 627R Regulator, a plastic frame was sized to be inserted into the throat and a rubber flapper was mounted therein so as to extend across and block off the throat. A single hole was located in the outer perimeter of the plastic frame and in a position so as not to be covered by the rubber flapper. This single hole in the plastic frame supporting the flapper was to provide sensing of the downstream pressure and so as to communicate this downstream pressure through the throat and into the regulator diaphragm casing. Also, during overpressure conditions, the rubber flapper may be flexed so that the stabilizer opens up fully to unblock the throat and to allow the flow of fluid from the pipeline into the throat and

2 through the diaphragm casing and eventually into the upper casing so as to exit from the regulator venting port during internal relief of the unit.

Another stabilizer for gas pressure regulators is shown in U.S. Pat. No. 5,402,820, assigned to the same assignee as herein, and utilizes a flow restriction technique in an improvement of the prior mentioned stabilizer. In the improved stabilizer, three apertures are symmetrically located around the outer perimeter of the flexible flapper element to provide increased regulator stability which is not affected by the location and orientation of the stabilizer mounting within the regulator throat.

Rather than stabilizers using flow restriction, other types of stabilizers have been used, including O-ring type elastomers mounted on internal components of the regulator to dampen the component movements and thereby provide flow fluctuation stabilization. In some cases, an O-ring is suitably mounted within the regulator so as to dampen the diaphragm movements. In other cases, an O-ring is mounted within the pivoting lever/pin mounting configuration so as to dampen the movements of the lever.

All prior known stabilizers for pressure regulators contain certain undesirable characteristics or failure to perform. For example, the flow restriction type stabilizers require several individual parts and time consuming assembly operations. While the O-ring type stabilizers reduce the number of parts, there still is a substantial assembly operation required to place the O-rings in the desired positions.

Another requirement is that gas pressure regulators must operate at increased gas pressures under stable conditions and without any harmonic instability or other undesired fluid flow fluctuations. As an example, starting in 1997 pressure regulators for use in propane gas systems must be able to operate under stable conditions up to a maximum pressure of 250 psi (17.2 Bar).

Accordingly, it is desired to provide a stabilizer for pressure reducing regulators which decreases regulator instability and which can provide a stable fluid flow up to maximum pressures of 250 psi (17.2 Bar). Further, it is desired to provide a stabilizer utilizing fewer parts and assembly operations and therefore lower costs than presently available devices.

SUMMARY OF THE INVENTION

A stabilizer for stabilizing the flow fluctuation performance of fluid pressure regulators by adding friction to a moving internal regulator component. A spring clip is mounted within the regulator body to frictionally engage the pivoting lever arm to thereby remove or significantly reduce the flow fluctuations in pressure regulation. Thus, any flow oscillations which would tend to begin due to pressures inside the regulator and opposing component forces are inhibited by frictional engagement of the spring clip with the lever.

In a second embodiment of the invention, a flat disk-like wedge having two oppositely disposed leg portions is mounted between the diaphragm plate and an interior wall of the regulator body. This configuration and location of the disk wedge adds friction to oppose the movement of the diaphragm.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

FIGS. 1–6 illustrate two different embodiments of a fluid pressure regulator, such as a gas pressure regulator in accordance with the invention. Each of the illustrated gas pressure regulators includes a stabilizer for stabilizing the fluid flow fluctuation performance of the pressure regulator as will be described hereinafter. In the preferred embodiment of FIGS. 1–3, a spring clip is provided to frictionally engage the moving regulator lever arm. In the alternative embodiment of FIGS. 4–6, there is provided a disk wedge captured above the diaphragm to create friction as the diaphragm tends to move during fluid pressure regulation.

Figure 1:
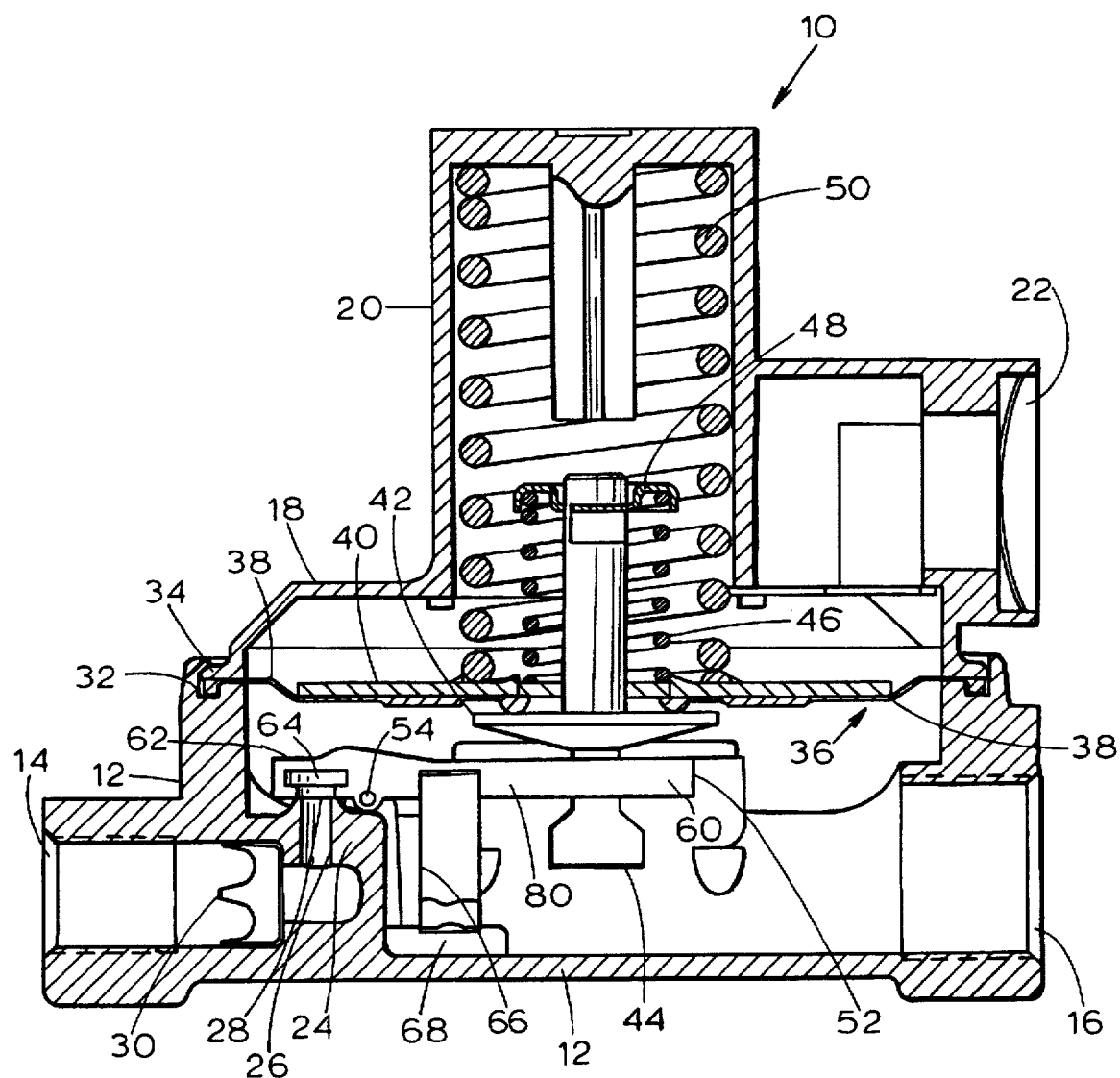
FIG. 1 is a sectional view of a fluid pressure regulator including a stabilizer in accordance with the principles of the present invention.
Figure 2:
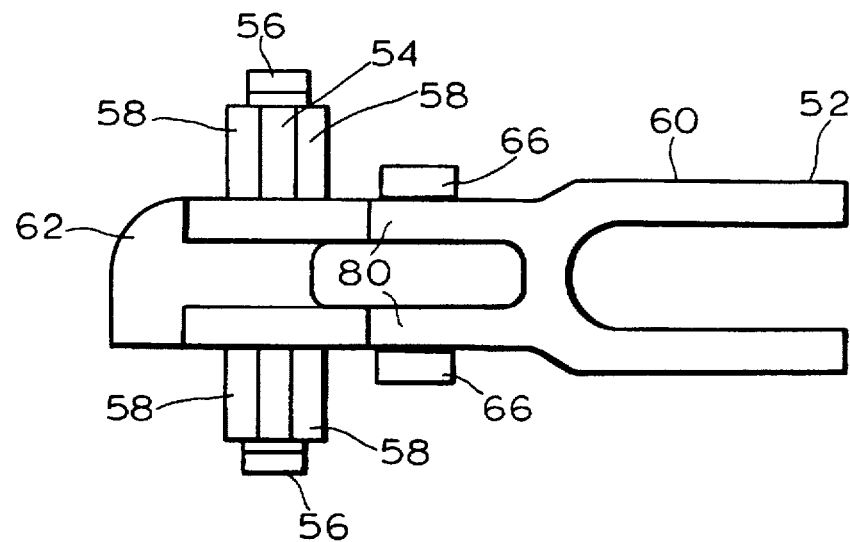
FIG. 2 is a fragmented plan view of the pressure regulator lever arm and pivot pin assembly within the regulator FIG. 1.
Figure 3:
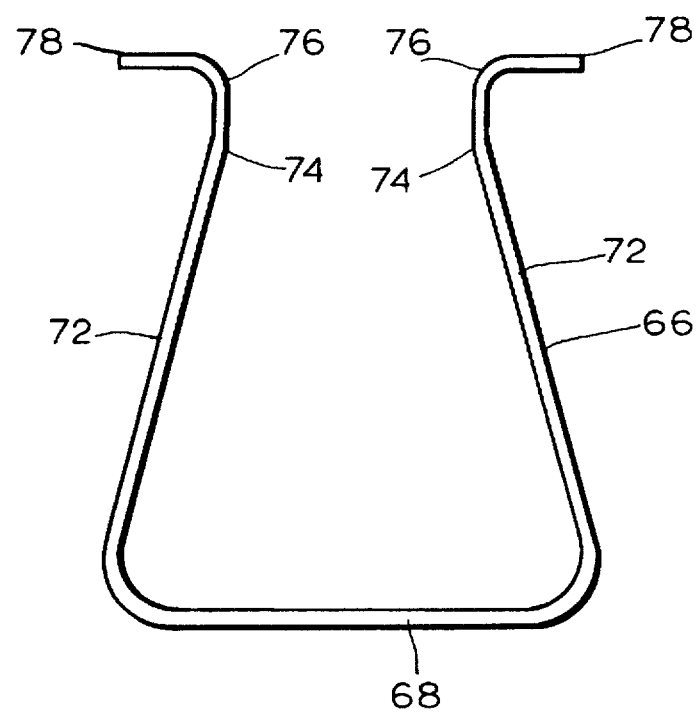
FIG. 3 is an elevational view of a spring clip for frictionally engaging the lever arm.

FIG. 1 illustrates a gas pressure regulator 10 constructed in accordance with the principles of the present invention and including a body 12 having a fluid inlet 14 and a fluid outlet 16. A cover 18 includes the spring case portion 20 and a vent outlet 22.

In accordance with conventional devices of this type, the inlet 14 of the pressure regulator 10 may be connected to a high pressure gas source such as liquified petroleum gas. The pressure regulator 10 reduces the pressure at the input 14 and communicates the lower pressure to the regulator outlet 16. The pressure at the outlet 16 is maintained below a desired maximum pressure level and the gas flow rate is regulated in accordance with the demand.

Body 12 includes an interior wall 24 containing a passageway 26 which communicates the inlet 14 to the outlet 20 through an orifice 28. A screen element 30 is mounted in the body between the inlet 14 and the passageway 26 for capturing any undesired particulate matter. At the top of body 12, there is provided an annular groove 32 for receiving a similarly shaped end lip 34 of the cover 18.

A loading element in the form of a diaphragm assembly 36 mounted within the regulator includes a diaphragm 38 mounted at its perimeter between the lip 34 and body 12, and a diaphragm plate 40 mounted to the central portion of the diaphragm. A relief valve seat 42 with an attached pusher post 44 is provided to lock the diaphragm assembly together. A relief spring 46 has one end maintained within a spring retainer 48 captured at one end of pusher post 44 and the other release spring end abutting against the diaphragm plate 40. A diaphragm spring 50 within the spring case 20 applies a sufficient loading force downwardly on the diaphragm plate 40 so as to provide a pressure set point for the regulator.

A lever assembly includes a pivoting lever 52 with a pivot pin 54. The pivot pin 54 is captured between opposite body end brackets 56 and opposite finger-like body portions 58. A forked lever portion 60 is drivingly engaged with the end of the pusher post 44. Another lever end 62 includes a notched portion within which is mounted a sealing disk 64 for engaging the orifice 28 and restricting the passage of fluid in passageway 26 between inlet 14 and outlet 16 of body 12 in response to the regulator loading element, i.e., diaphragm assembly 36.

A U-shaped spring clip 66 includes a lower base portion 68 riveted or welded to the body 12, and clip arms 72 extending upwardly from opposite ends of the base 68. As can be seen mostly clearly in FIG. 3, the clip arms 72 extend upwardly and in a convergent manner except for opposite parallel portions between reference points 74, 76. That is, the surface portions of each clip arm 72 between the portions 74, 76 extend parallel to each other. The respective ends 78 of the clip arms 72 starting at reference points 76 extend away from each other as shown most clearly in FIG. 3.

The clip 66 is riveted or welded to the body 12 so that the parallel surface portions between reference points 74, 76 on each of the clip arms 72 frictionally engage the lever 52 at a middle lever portion 80. Thus, as the lever 52 pivots about pivot pin 54, the lever frictionally engages the spring clip 66 at the parallel surfaces between reference points 74, 76. The pivoting lever 52 is thereby dampened in its movement.

In the initial set-up of regulator 10, an adjusting screw coupled to diaphragm spring 50 is adjusted to adjust the spring compression on diaphragm 38 while the downstream pressure at outlet 16 is monitored with a pressure gauge during the adjustment procedure. Adjusting the spring compression so as to compress the diaphragm spring 50 tends to urge the diaphragm assembly downward in FIG. 1, thereby pivoting the lever 52 in a clockwise direction about pin 54 which lifts the disk 64 off of or away from the orifice 28. This opens the orifice or increases the opening and allows the coupling of fluid between the inlet 14 and the outlet 16 via the orifice passageway 26.

When the pipeline load flow decreases, this causes an increase in the downstream pressure at outlet 16, which pressures coupled below the diaphragm 38. The regulator 10 must regulate the flow of fluid through the body 12 so as to prevent too much gas being placed into the system. Thus, as the pressure increases in the diaphragm casing below diaphragm 38 beyond the regulator set point, this forces the diaphragm 38 upwardly in FIG. 1 which pivots lever arm 52 counter-clockwise about the pivot pin 54 so as to move the disk 64 toward the orifice and thereby restrict the passage of gas through passageway 26. Thus, once the regulator set point is reached, the regulator must match the flow of gas through the regulator to the demand for gas placed upon the system.

In connection with the regulator of FIG. 1, this means that the fluid flow area through passageway 26 is proportionally increased or reduced in relation to downstream demand, until a position of equilibrium is reached and the regulator maintains a steady-state position about the regulator set point. It is therefore desired that the regulator provide a stable flow of fluid or gas through the body 12 so as to match the amount required by the system.

In accordance with the principles of the present invention, the spring clip 66 frictionally engaging the lever 52 at its middle portion 80 provides a stabilizing operation to stabilize the regulator performance, i.e. provide stability in the regulator output pressure as a function of the system's pressure demands as the regulator operates to maintain the desired set point. Utilizing the spring clip 66, the pressure regulator 10 can handle maximum pressures of 250 psi (17.2 Bar) at the inlet 14.

Figure 4:
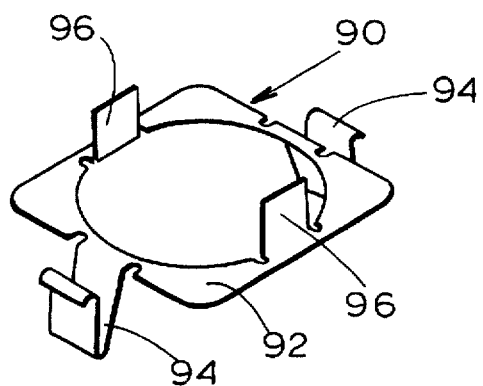
FIG. 4 is a perspective view of a disk wedge in accordance with another embodiment of the invention.
Figure 5:
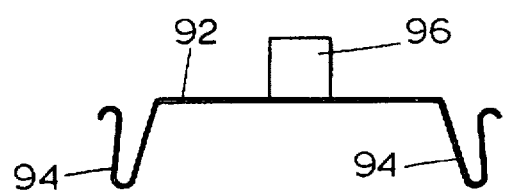
FIG. 5 is a front elevational view of the disk wedge of FIG. 4.
Figure 6:
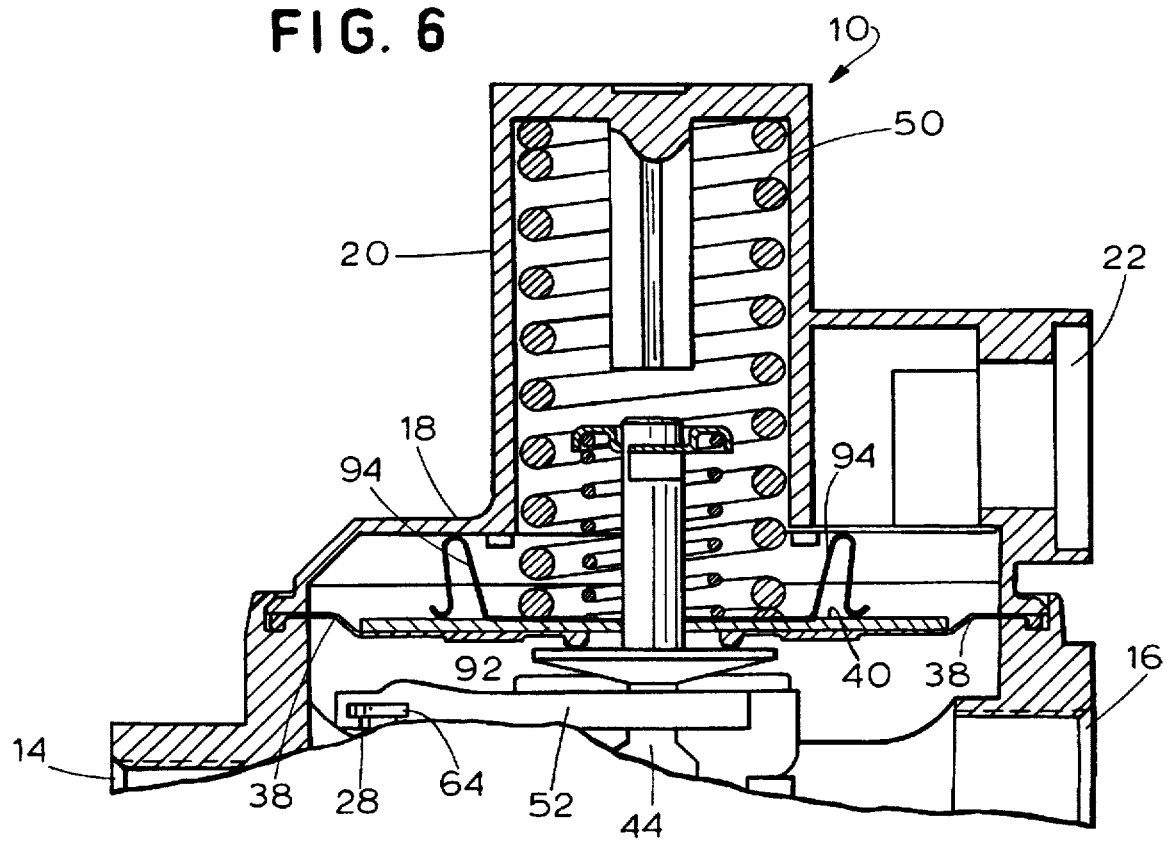
FIG. 6 is a sectional view of the fluid pressure regulator including a stabilizer disk wedge of the type shown in FIG. 4.

Referring now to FIGS. 4–6, there is illustrated another embodiment of the present invention utilizing a disk wedge 90 inserted above the diaphragm plate 40, as shown in FIG. 6, to thereby create frictional engagement with the diaphragm assembly in response to movement of the diaphragm 38. The disk wedge 90 includes a flat base portion 92 with two opposite leg portions 94 extending in one direction from the base 92 and two other opposite legs 96 extending in a second direction from the base 92.

The disk wedge 90 is mounted in position above the diaphragm plate 40 so that the legs 96 extend on each side of the pusher post above the relief valve seat 42 to aid in maintaining the disk wedge in position. The leg portions 94 are captured between the diaphragm 40 and an upper wall of the body 12 and thereby frictionally load the moving diaphragm.

The foregoing detailed description has been given for clearness of understanding only, and no unnecessary limitations should be understood therefrom, as modifications will be obvious to those skilled in the art.

What is claimed:

1. In a gas pressure regulator including a gas flow control orifice communicating the gas from a regulator input to a regulator output, a moving diaphragm responding to pressure changes, and a pivoting lever coupled between the diaphragm and the flow control orifice to regulate the flow of gas through the flow control orifice in response to the moving diaphragm, the improvement of a stabilizer for fluid flow fluctuations to stabilize pressure regulation, said stabilizer comprising:

a spring clip mounted in said gas pressure regulator in frictional engagement with said pivoting lever, said spring clip including opposite parallel surfaces frictionally engaging said pivoting lever during pivoting movement of said pivoting lever.

2. A gas pressure regulator according to claim 1, wherein said spring clip includes a base mounted to said regulator, and respective spring clip arms having said respective parallel surface.

3. In a gas pressure regulator including a gas flow control orifice communicating the gas from a regulator input to a regulator output, a moving diaphragm responding to pressure changes, and a pivoting lever coupled between the diaphragm and the flow control orifice to regulate the flow of gas through the flow control orifice in response to the moving diaphragm, the improvement of a stabilizer for fluid flow fluctuations to stabilize pressure regulation, said stabilizer comprising:

a disk wedge having opposite leg portions, said disk wedge mounted in said gas pressure regulator in frictional engagement with said moving diaphragm.

4. In a gas pressure regulator including a regulator body having a fluid inlet and a fluid outlet, a gas flow control orifice communicating the gas from the fluid inlet to the fluid outlet, a moving diaphragm responding to pressure changes, and a pivoting lever pivotally mounted to the regulator body and coupled between the diaphragm and the flow control orifice to pivotally move and regulate the flow of gas through the flow control orifice in response to the moving diaphragm, the improvement of a stabilizer for fluid flow fluctuations to stabilize pressure regulation, said stabilizer comprising:

a spring member mounted in said gas pressure regulator in frictional engagement with said pivoting lever;

said spring member including a base portion and a surface portion extending from said base portion;

said base portion mounted to said regulator body, and said surface portion in frictional engagement contact with said pivoting lever during said pivotal movement to frictionally resist and dampen said pivotal movement and thereby stabilize pressure regulation.

* * * * *